March 14, 1972  L. E. TISDALE  3,649,403
APPARATUS FOR PRODUCING EXPANDABLE CORE MATERIAL
Filed Jan. 27, 1969  3 Sheets-Sheet 1
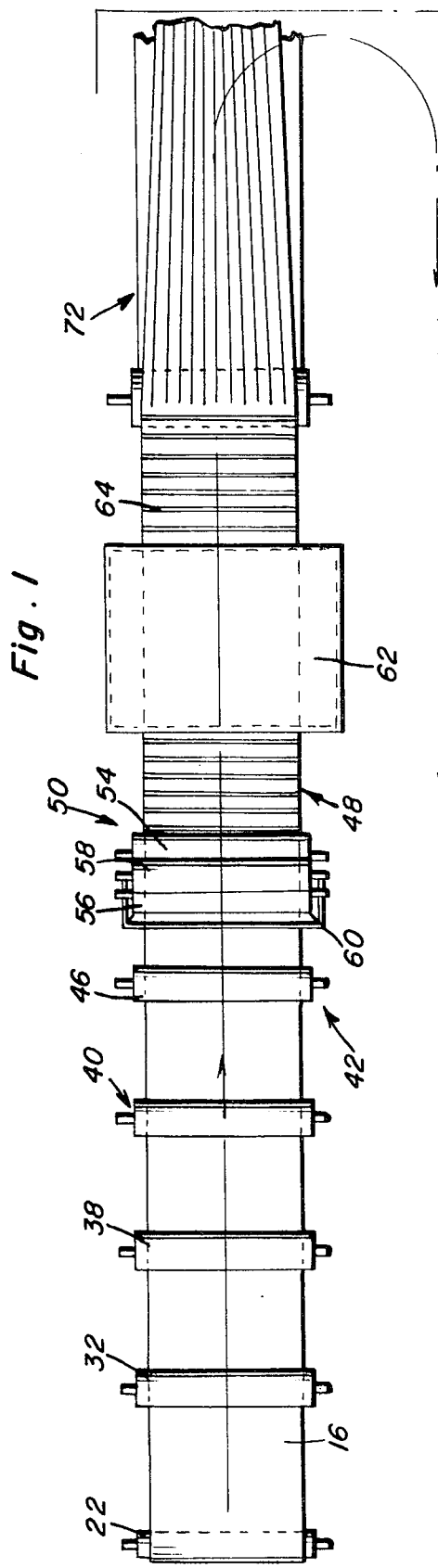
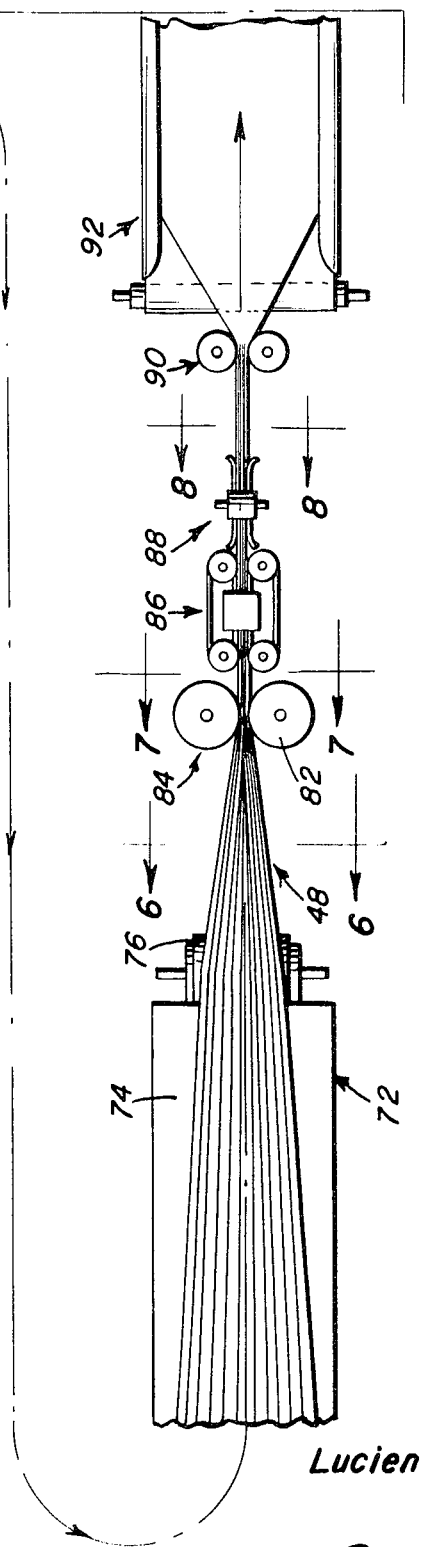
Lucien E. Tisdale
INVENTOR.

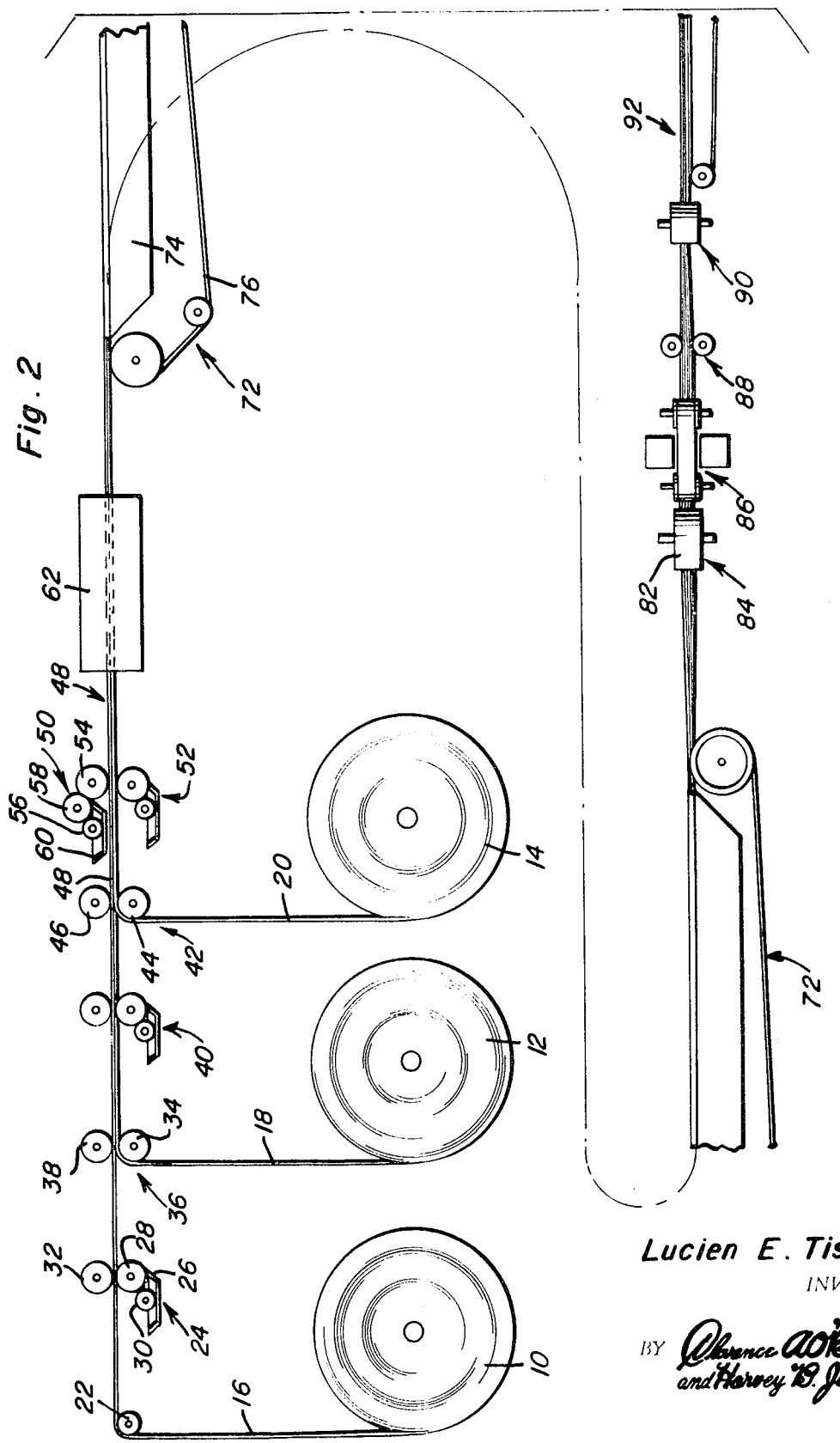

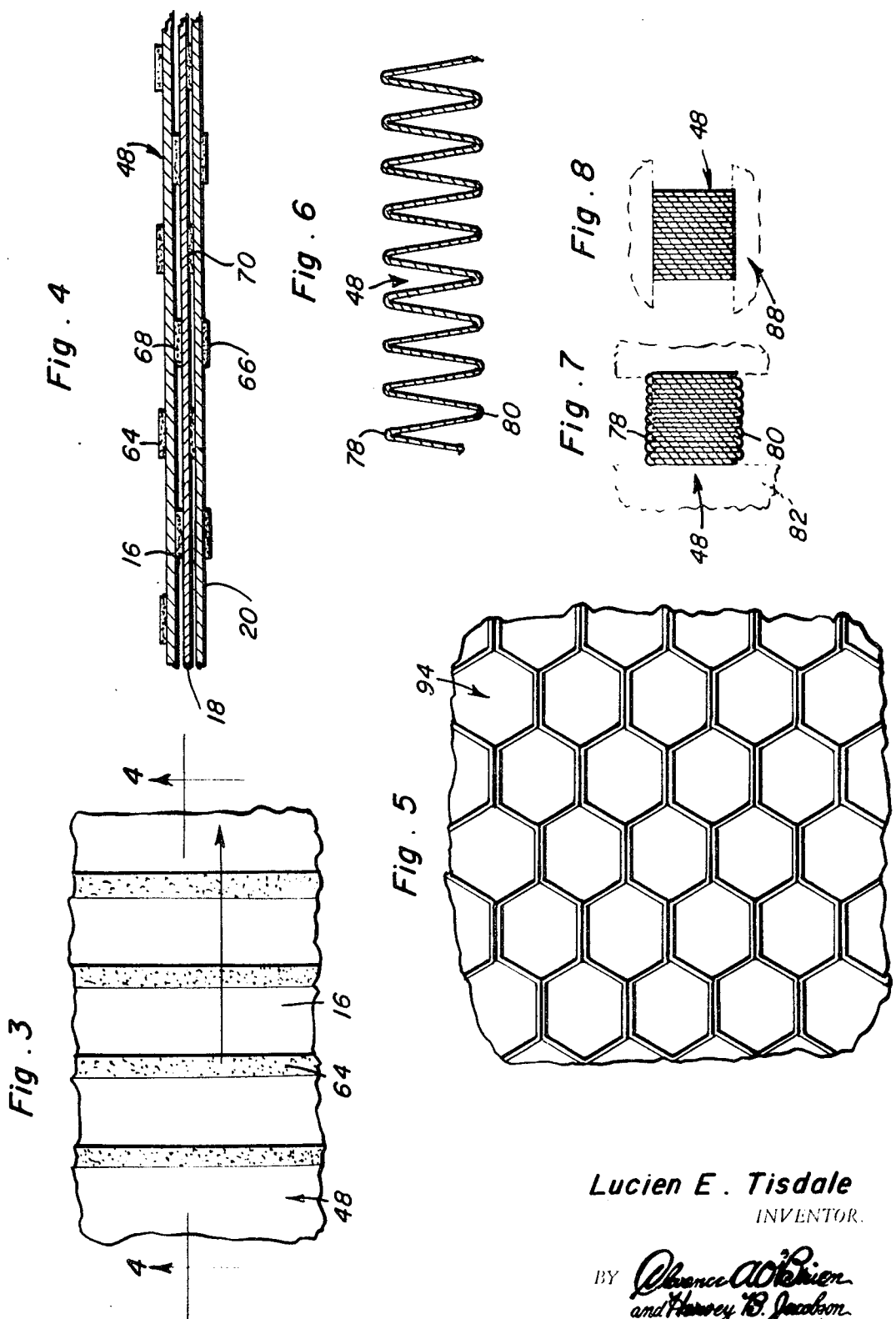

United States Patent Office 3,649,403
Patented Mar. 14, 1972

3,649,403
APPARATUS FOR PRODUCING EXPANDABLE CORE MATERIAL
Lucien E. Tisdale, Monroe, La., assignor to Ridge Ply, Inc.
Filed Jan. 27, 1969, Ser. No. 794,291
Int. Cl. B31d 3/02
U.S. Cl. 156—197   2 Claims

ABSTRACT OF THE DISCLOSURE

A lamination of three or more webs employing glue printers to provide a predetermined pattern of transverse stripes of adhesive on the webs and on the top and bottom surfaces of the assembled lamination after which the lamination is corrugated as it moves longitudinally into an accordion folded condition with the folded edges then being trimmed to provide an unexpected honeycomb core. The unexpected honeycomb core is then expanded to form a honeycomb core material.

---

The present invention generally relates to the formation of expandable honeycomb core material and employs an apparatus to provide a laminated web which is corrugated and folded as it moves longitudinally into a generally accordion folded position after which the folded longitudinal edges are removed by use of edge slitters or trimmers so that the core material is then capable of being expanded into a honeycomb core.

The present invention generally relates to an apparatus for forming honeycomb material and specifically to the apparatus for producing a laminated web constructed from three or more single ply webs glued together by the use of glue printers and laminators with the top and bottom surfaces of the laminated web also having glue applied thereto for enabling the laminated web to be longitudinally corrugated or folded and formed into a honeycomb core material.

In my prior Pat. No. 3,178,494, issued Apr. 13, 1965, there is disclosed a method and an apparatus for forming longitudinal corrugations in a web of material employed in constructing expandable honeycomb core material and the like in which a single ply web is fed into the machine and longitudinal corrugations are formed therein by passing the web over a vacuum box having converging ribs and grooves therein with the vacuum conforming the web of material with the configuration of the longitudinally converging ribs and grooves. In the present invention, the web being supplied to the corrugating apparatus is a multiple layer web laminated together by employing glue printers with the top and bottom surfaces of the laminated web also having glue applied thereto in a predetermined pattern so that when the panel is corrugated longitudinally and squeezed laterally, the longitudinal accordion folded web will be laminated into a strip having alternate fold edges at the top and bottom thereof so that the strip may be slit to remove the folded edges thus forming a laminated expandable honeycomb core material. The apparatus for laterally compressing the longitudinally corrugated and folded laminated web, trimming the edges and then expanding the honeycomb core is generally quite similar to the structure disclosed in Pat. No. 2,648,371, issued Aug. 11, 1953.

Inasmuch as the previously known devices employ a single ply web for longitudinal corrugation, one of the essential features of this invention is the provision of an apparatus which employs a multiple ply or layer of paper material to form a laminated web with glue printers and laminators being provided for forming the laminated web and an additional glue printer being provided for applying glue to the top and bottom surfaces of the laminated web prior to longitudinal corrugations and transverse compression and lamination thereof.

A further object of the present invention is to provide apparatus for producing expandable core material which is quite simple in construction, easy to employ and control and relatively inexpensive to manufacture and use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of the apparatus of the present invention illustrating the various components thereof;

FIG. 2 is a side elevational view of the construction of FIG. 1;

FIG. 3 is a plan view of the laminated web illustrating the glue strips applied to the top surface thereof;

FIG. 4 is a vertical sectional view taken substantially upon a plane passing along section line 4—4 of FIG. 3 illustrating the laminated construction of the web with the adhesive stripes illustrated thereon;

FIG. 5 is a plan view illustrating the expanded honeycomb core material;

FIG. 6 is a transverse, sectional view taken substantially upon the plane passing along section line 6—6 illustrating the condition of the laminated web as it leaves the longitudinal corrugator;

FIG. 7 is a transverse, sectional view taken substantially upon a plane passing along section line 7—7 of FIG. 1 illustrating the lateral compression and lamination of the longitudinally corrugated laminated web in which the adhesive stripes on the top and bottom surfaces serve to laminate the accordion folded web; and FIG. 8 is a sectional view taken substantially upon a plane passing along section line 8—8 of FIG. 1 illustrating the edge trimming operation where the folded edges at the top and bottom surfaces of the laminated and longitudinally corrugated web are removed thus providing an expandable core material.

Referring now specifically to FIGS. 1 and 2, the apparatus of the present invention includes supply rolls of paper or other suitable material including a supply roll 10 for a top sheet, a supply roll 12 for an intermediate sheet and a supply roll 14 for a bottom sheet with the upper sheet or top sheet being designated by numeral 16, the intermediate sheet being designated by numeral 18 and the bottom sheet being designated by numeral 20. These supply rolls may be supported in any suitable manner with the sheets being unwound upwardly therefrom. The top sheet 16 passes upwardly and over a roller 22 and then through a glue printer or applicator 24 which includes a tray or pan 26 having glue therein, an applying roller 28 which engages the undersurface of the top sheet of material 16 and a transfer roller 30 which transfers the glue from the tray or pan 26 onto the surface of the applicator roller 28. The applicator roller 28 will have a longitudinal rib thereon which will apply a stripe of adhesive material such as glue to the undersurface of the top sheet 16. A backing roller 32 engages the top surface of the top sheet 16 in opposed relation to the applicator roller 28 to assure proper application of the glue stripe to the top sheet 16.

The intermediate sheet 18 extends upwardly and passes over the bottom roller 34 of a laminator 36 which also has a top roller 38 in opposed relation to the roller 34. As illustrated in FIG. 1, the top sheet 16 with the glue stripes applied to the undersurface thereof enters between the rollers 34 and 38 with the intermediate sheet thereunder so that the intermediate sheet 18 and the top sheet 16 will be laminated by the laminator structure 36 which presses the sheet 16 and the sheet 18 together. From the laminator 36, the laminated top and intermediate sheets 16 and 18 pass through a glue printer 40 the same in construction as the glue printer 24 with the glue printer 40 applying stripes of adhesive or glue to the undersurface of the intermediate sheet 18 which has already been bonded to the top sheet 16. The bonded top and intermediate sheets 16 and 18 with glue stripes on the undersurface thereof then passes through laminator 42 which includes a bottom roll 44 and a top roll 46 in the same manner as the laminator 36. The bottom sheet 20 passes over the bottom roller 44 and the rollers 44 and 46 laminate the bottom sheet 20 to the intermediate sheet 18 thus forming a laminated web 48 of three sheets of material 16, 18 and 20 with the sheets being laminated together by staggered stripes of adhesive applied by the glue printers 24 and 40 and laminated together by the laminators 36 and 42.

The laminated web 48 then passes between upper and lower glue printers 50 and 52 respectively which apply stripes of adhesive across the top and bottom surfaces of the laminated web 48 in a predetermined pattern. The glue printer 52 is identical to the glue printer 40 with the glue printer 50 also being substantially identical thereto except that the top roller 54 acts as an applicator roller and two transfer rollers 56 and 58 are provided for lifting the glue out of the glue pan or tray 60 and applying it to the periphery of the applicator roller 54. The laminated web 48 then includes transverse stripes of adhesive on both the top and bottom surfaces thereof and this web then enters a dryer 62 which dries or at least partially dries the adhesive material.

FIG. 3 illustrates the web 48 with the stripes of adhesive material, glue or the like 64 applied to the top surface thereof and FIG. 4 illustrates the top sheet 16, the intermediate sheet 18 and the bottom sheet 20 with the adhesive stripes 66 on the undersurface of the bottom sheet 20 and, of course, on the undersurface of the laminated web 48. As illustrated, the adhesive stripes 64 and 66 are longitudinally staggered in relation to each other and the adhesive stripes 68 between the top sheet 16 and the intermediate sheet 18 are staggered in relation to the stripes 64 but are in alignment with the stripes 66. The adhesive stripes 70 between the intermediate sheet 18 and the bottom sheet 20 are staggered in relation to the stripes 68 and 66 but are in alignment with the stripes 64 on the top sheet 16. The stripes are oriented at right angles to the center line of the machine and the web and the dryer 62 may be of conventional construction using either infrared radiation or hot air to dry the adhesive to a tack-free condition.

From this position, the laminated web 48 passes into a longitudinal corrugator generally designated by the numeral 72 which is substantially the same as that construction disclosed in my prior Pat. No. 3,178,494, issued Apr. 13, 1965, which includes a vacuum box 74, a conveyor structure 76, and longitudinal ribs and grooves which converge and have apertures communicating with the vacuum box to form longitudinal corrugations or folds with alternate top and bottom folding edges 78 and 80 with the transverse configuration at the discharge of the longitudinal corrugator generally illustrated in FIG. 6 with the laminated web 48 being longitudinally corrugated to form an accordion fold extending continuously throughout the length of the web.

While in this folded condition, the longitudinally corrugated web passes through laminating rollers 82 of a laminator 84 and a heater 86, an edge trimmer 88, pull rolls 90 and an expansion section 92. The structure from the discharge of the corrugator 72 and including the expansion section is generally the same as that disclosed in the patent to Goodwin et al., 2,648,371, issued Aug. 11, 1953.

FIG. 7 illustrates the laminated web as it passes through the laminator rolls 82 and FIG. 8 illustrates the laminated core material as it passes between the edge trimmer 88 which removes the top and bottom folded edges 78 and 80. After these edges have been removed, the core material which is laminated together can be expanded to form an expanded honeycomb core generally designated by numeral 94 in FIG. 5.

The heater at 86 is a dielectric heater where the heat penetrates the complete mass of the web while it is held in compressed condition to reactivate all of the adhesive stripes previously applied thus causing adhesion between all glued surfaces. After the compressed web passes through the edge trimmer where the top and bottom folds are trimmed away by rapidly revolving cutters or the like, the material is complete and is known as unexpanded honeycomb core and if it is desired to ship the material to a point of use prior to expansion, this can be accomplished by eliminating the pull rolls and expansion section or the expansion and pull rolls may be employed to expand the core so that top and bottom liner sheets can be applied in a manner well known in the art.

While three sheets of material or webs have been illustrated, it will be appreciated that additional sheets of material may be employed as desired with each additional sheet of material including an additional glue printer and laminator so that the plies of material are printed with alternate stripes of adhesive so spaced that when the laminated web is pleated longitudinally and the folds pressed together, the contact areas of adhesive will fall into the proper configuration for a honeycomb construction as illustrated in FIG. 5. Thus, with the present invention, a plurality of webs in superposed relation to form a laminated web may be used in order to provide sufficient material for construction of honeycomb core with sufficient width for practical application. The particular materials employed for the webs as well as the particular glue, laminating structures, drying structures and the like are all well known to those skilled in the art. The glue printers or applicators are also well known structures capable of operation in a timed relation to the web moving therepast for accurate printing of transverse stripes of adhesive on the sheets of material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for producing a laminated web of expandable core material comprising a supply roll of paper material for a top sheet of paper material, a supply roll of paper material for an intermediate sheet of paper material, a supply roll for a bottom sheet of paper material, means guiding the sheets of material into overlying relation, a glue applicator for applying adhesive material in transverse stripes across the undersurface of the top sheet of paper material, a laminator for laminating the top sheet of paper material to the upper surface of the intermediate sheet of paper material, a glue applicator for applying adhesive in transverse stripes across the undersurface of the intermediate sheet of material, a laminator for laminating the bottom sheet of material to the intermediate sheet of material thereby forming a laminated web bonded together with the stripes of adhesive being in staggered relation, glue applying means for applying transverse stripes of adhesive across the top surface of the laminated web, glue applying means for applying adhesive in transverse stripes across the bottom surface of the laminated web, a dryer for drying the adhesive stripes on the top and bottom surfaces of the laminated web, a longitudinal corrugating device for receiving the laminated web and forming longitudinal folds continuously therein with the folds being defined by top and bottom reversely folded edges, means for laterally squeezing the longitudinally corrugated and folded laminated web, means heating the longitudinally folded web so that all of the adhesive stripes bond the folds of the web to each other, and means trimming the top and bottom edges of the folded web to remove the folded edges thus defining an expandable core material.

2. The structure as defined in claim 1 together with pull rolls and expansion means for expanding the core material.

References Cited

UNITED STATES PATENTS

| | | | |
|---|---|---|---|
| 2,648,371 | 8/1953 | Goodwin et al. | 156—197 |
| 2,649,131 | 8/1953 | Lincoln | 156—197 |
| 2,993,525 | 7/1961 | Lincoln | 156—444 |
| 3,077,223 | 2/1963 | Hartsell | 156—548 |
| 3,178,494 | 4/1965 | Tisdale | 156—200 X |

SAMUEL W. ENGLE, Primary Examiner

U.S. Cl. X.R.

156—200, 267, 443, 461